(12) United States Patent
Dalsgaard

(10) Patent No.: US 8,862,188 B2
(45) Date of Patent: Oct. 14, 2014

(54) FLEXIBLE DISCONTINUOUS RECEPTION SCHEME BASED ON LIKELIHOOD OF SCHEDULING

(75) Inventor: Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 204 days.

(21) Appl. No.: 13/248,649

(22) Filed: Sep. 29, 2011

(65) Prior Publication Data

US 2013/0084848 A1    Apr. 4, 2013

(51) Int. Cl.
*H04M 1/00*  (2006.01)
*H04W 76/04* (2009.01)
*H04W 52/02* (2009.01)

(52) U.S. Cl.
CPC ........ *H04W 52/0216* (2013.01); *H04W 76/048* (2013.01)
USPC ........................................ 455/574; 455/422.1

(58) Field of Classification Search
USPC .......................... 455/422.1, 574; 370/311, 322
See application file for complete search history.

(56) References Cited

U.S. PATENT DOCUMENTS

| | | | | |
|---|---|---|---|---|
| 7,872,986 B2 * | 1/2011 | Chun et al. | ..................... | 370/252 |
| 7,933,243 B2 * | 4/2011 | Yi et al. | ......................... | 370/329 |
| 8,031,668 B2 * | 10/2011 | Wang et al. | ..................... | 370/329 |
| 8,060,153 B2 * | 11/2011 | Jeong et al. | ..................... | 455/574 |
| 8,320,287 B2 * | 11/2012 | Cai et al. | ....................... | 370/311 |
| 8,462,803 B2 * | 6/2013 | Susitaival et al. | ............. | 370/412 |
| 2007/0291728 A1 | 12/2007 | Dalsgaard et al. | | |
| 2008/0075036 A1 | 3/2008 | Bertrand et al. | | |

FOREIGN PATENT DOCUMENTS

| | | |
|---|---|---|
| EP | 1511335 A2 | 3/2005 |
| EP | 1903814 A2 | 3/2008 |
| WO | 2008133564 A1 | 11/2008 |

OTHER PUBLICATIONS

Xu H. B. et al, 'An improved dynamic user equipment power saving mechanism for LTE system and performance analysis', Science China Information Sciences, Oct. 2010, vol. 53, No. 10, p. 2075-2086, ISSN 1674-733X.
Yang S.R, 'Dynamic Power Saving Mechanism for 3G UMTS System', Mobile Networks and Applications, Feb. 2007, vol. 12, No. 5, p. 5-14, ISSN 1383-469X.
Enjie Liu et al, 'A Counter-Driven Adaptive Sleep Mode Scheme for 802, 16e Networks', In: 2011 IEEE 73rd Vehicular Technology Conference (VTCSpring), IEEE, 2011 (May 15, 2011).
International Search Report, Nov. 15, 2012.

* cited by examiner

*Primary Examiner* — Temica M Beamer
(74) *Attorney, Agent, or Firm* — Squire Patton Boggs (US) LLP

(57) ABSTRACT

One embodiment is directed to a method for applying a flexible discontinuous reception scheme. The method includes initializing, at a user equipment, a timing alignment timer. The method then includes determining a type of discontinuous reception cycle to apply based on a likelihood of scheduling of the user equipment, and applying the determined type of discontinuous reception cycle.

17 Claims, 5 Drawing Sheets

US 8,862,188 B2

FLEXIBLE DISCONTINUOUS RECEPTION SCHEME BASED ON LIKELIHOOD OF SCHEDULING

BACKGROUND

1. Field

Embodiments of the invention relate to wireless communications networks, such as the Universal Mobile Telecommunications System (UMTS) Terrestrial Radio Access Network (UTRAN) Long Term Evolution (LTE) and Evolved UTRAN (E-UTRAN).

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

SUMMARY

One embodiment is directed to a method for applying a flexible discontinuous reception scheme. The method includes initializing, at a user equipment, a timing alignment timer. The method then includes determining a type of discontinuous reception cycle to apply based on a likelihood of scheduling of the user equipment, and applying the determined type of discontinuous reception cycle.

Another embodiment is directed to an apparatus. The apparatus includes at least one processor and at least one memory including computer program code. The at least one memory and the computer program code are configured, with the at least one processor, to cause the apparatus at least to initialize a timing alignment timer, determine a type of discontinuous reception cycle to apply based on a likelihood of scheduling of the apparatus, and apply the determined type of discontinuous reception cycle.

Another embodiment is directed to a computer program, embodied on a non-transitory computer readable medium, the computer program is configured to control a processor to perform a process. The process includes initializing, at a user equipment, a timing alignment timer, determining a type of discontinuous reception cycle to apply based on a likelihood of scheduling of the user equipment, and applying the determined type of discontinuous reception cycle.

BRIEF DESCRIPTION OF THE DRAWINGS

For proper understanding of the invention, reference should be made to the accompanying drawings, wherein.

DETAILED DESCRIPTION

Figure 1:
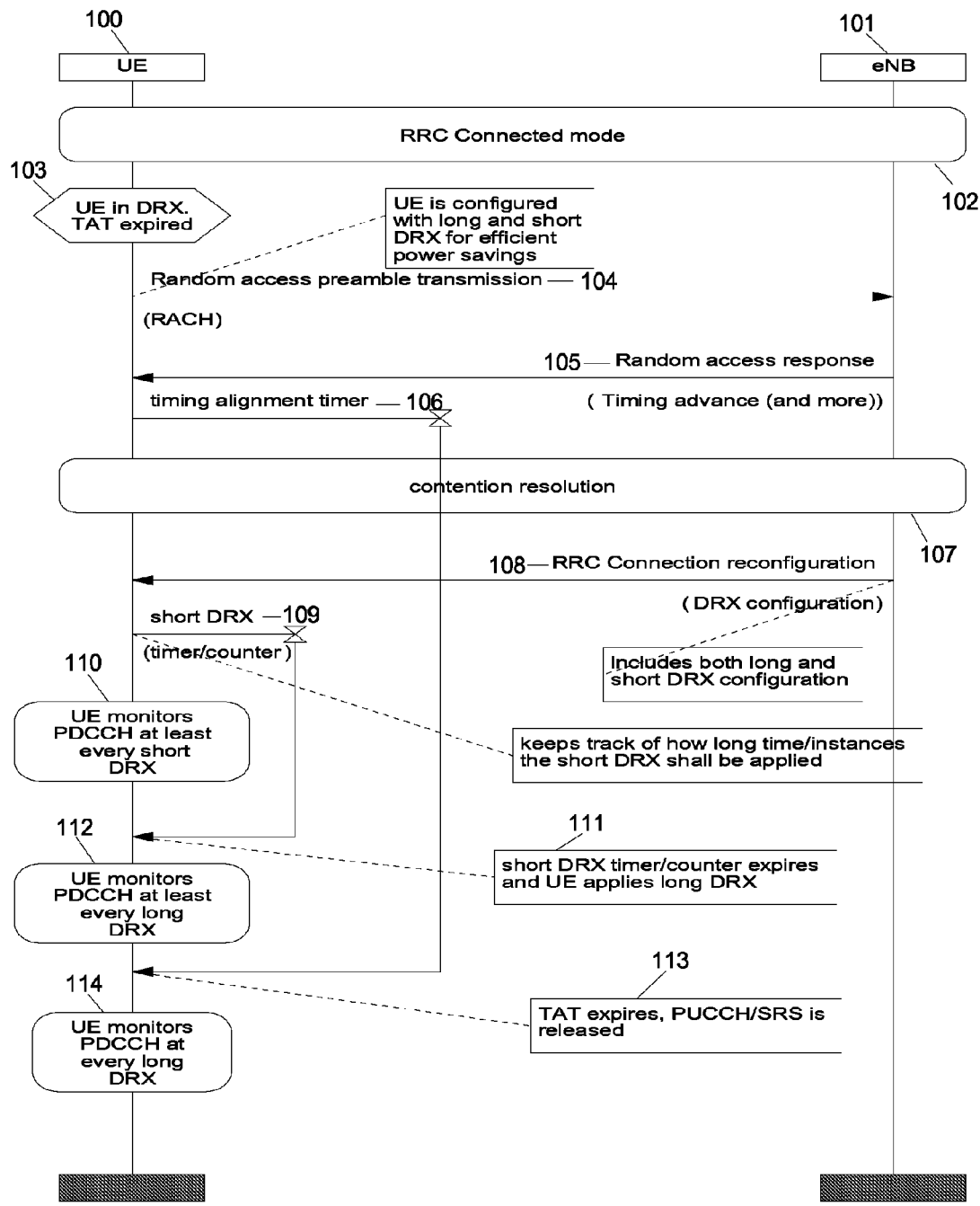
FIG. 1 illustrate a signaling diagram between user equipment and a node-B.

Embodiments of the invention relate to E-UTRAN and, in some embodiments, relate to E-UTRAN UE power consumption, enhanced diverse data application, UE scheduling and physical downlink control channel (PDCCH) monitoring. The early phases of the E-UTRAN specification (see 3GPP TS 36.331, 3GPP TS 36.321, and 3GPP TS 36.133) took UE power consumption in radio resource control (RRC) connected mode into account by defining the RRC connected mode discontinuous reception (DRX) scheme. This RRC connected mode DRX scheme enables the UE to achieve significant power savings when the RRC connected mode DRX feature is used and configured by the enhanced Node-B (eNB) and/or network.

While the current RRC connected mode DRX scheme may be efficient and satisfy basic requirements under certain circumstances, including enabling some UE power savings in RRC connected mode while allowing scheduling freedom in the eNB scheduler, the scheme has some limitations. One problem identified with the current RRC connected mode DRX scheme is that, although it is taking the actual data transmission activity over the air (radio interface) into account, it does not take into account the "readiness" of the scheduling combined with the likelihood of the scheduling to happen, in an efficient and intelligent manner. The readiness of being scheduled can be linked to the applied DRX and the likelihood of being scheduled can be deduced from the timing alignment timer (TAT) status.

Thus, embodiments of the invention provide a method that combines the knowledge of the scheduling likelihood and the use of shorter and/or longer DRX cycles into a combined scheme that enables maintaining high scheduling efficiency while still resulting in very good UE power savings.

One scheme for DRX configuration for RRC connected mode provides the option of configuring the UE with both a long DRX cycle and a short DRX cycle. The long DRX cycle may be defined as an integer number of short DRX cycles to ensure the UE and eNB synchronization even when scheduling failures happen. As a base, the long DRX is applied. When the UE is then scheduled, the UE will apply the short DRX cycle for a given number of cycles. Every time the UE is scheduled, the short DRX cycle applicability will be extended by resetting the counter. If the UE has not been scheduled at any occurrence while the short DRX cycle has been applied, the UE will fall back and start to use long DRX again.

The UE may also have a TAT running. This TAT is linked to the uplink timing advance life time. The TAT may be started or reset every time the UE receives a timing advance (TA)

value from the eNB. The UE may also be configured with various uplink resources, such as periodic channel quality indicator (CQI), sounding reference symbol (SRS), scheduling request (SR), etc. These allocations may only be valid as long as the UE has a valid TAT. When the TAT expires, the UE will release these resources and will need to be reconfigured with a new resource by the RRC. According to one embodiment, the TAT is used to control how long the UE is considered uplink time aligned.

As long as the UE has a valid TAT, the UE will have a high likelihood of having valid uplink resources as described above. This means that the eNB can quickly reach the UE simply by the eNB scheduling the UE through the physical downlink control channel (PDCCH) when the UE monitors the PDCCH according to DRX rules, for example. The UE can request uplink resources from the network by use of SR, which is a low latency request method for uplink resources, indicating the UE's need for access. Additionally, the UE is likely to also transmit periodic CQIs and SRSs for improved scheduling when this occurs. When the TAT expires, those resources are released on the UE and network side, as well as the eNB side where the resources can then be re-used. When the UE no longer has valid TAT, there are two ways to initiate traffic: 1) either network initiated by use of PDCCH order where the network orders the UE to transmit random access (RA) bursts on the random access channel (RACH) or 2) UE initiated RA burst transmission on RACH for UE initiated access.

Based on the above described procedures, embodiments of the invention are able to improve the current UE PDCCH monitoring rules (RRC connected mode DRX). One embodiment provides an enhanced DRX scheme for UE's in RRC Connected mode, such as in E-UTRAN. The enhancements provided by certain embodiments take advantage of intelligent use of multiple signaling related states shared between the UE and the network, combine this information, and, based on the combined information, apply an appropriate DRX cycle.

According to one embodiment, the UE will use, as input, the TAT and together with the fact that the TAT depends on whether the UE is actively scheduled (which triggers a reset (start or restart) of TAT) conclude to stay in a shorter or longer DRX cycle. For example, when the TAT expires, the UE will conclude that likelihood of data transmissions are rarer and the likelihood of being scheduled is lower or reduced. Therefore, the UE can apply the longer DRX cycle. However, when the TAT is running, the UE will conclude that the likelihood of data transmissions are higher and the likelihood of being scheduled is increased. As a result, the UE can apply the shorter DRX cycle. Thus, in one embodiment, the shorter DRX cycle is applied when the TAT is running and the longer DRX cycle is applied when the TAT has expired. It should be noted that the 'shorter DRX' cycle referred to herein does not necessarily mean the currently defined 'short DRX' cycle discussed in 3GPP TS 36.321. The shorter DRX cycle, according to one embodiment, may be configured/configurable by the network through signaling.

As both the longer and the shorter DRX cycles are recognized or known both by the UE and the eNB, and the state of the TAT is also known and synchronized between the UE and the eNB, embodiments of the invention lead to a procedure which in a synchronized manner ensures that the shorter DRX cycle is applied when the likelihood of any scheduling to happen is high (e.g., TAT is running) while the longer DRX is applied when the likelihood of scheduling is low (e.g., TAT has expired). When to apply which DRX cycle can be synchronized between the UE and the eNB based on the TAT status, and this synchronization can occur without additional signaling.

One embodiment of the invention can be applied with the current DRX definitions as provided in the current 3GPP specifications. Another embodiment can be applied by use of new definitions that can provide for increased network flexibility and freedom.

One embodiment of the present invention can utilize the long and short DRX cycles defined in current 3GPP specifications and re-use them with new definitions and rules. Accordingly, one embodiment defines new rules for applying the short DRX such that it is no longer based on a number of cycles. Instead, according to an embodiment, the short DRX will be applied as long as the TAT is running. One way this can be implemented within the current 3GPP specifications is to use one of the values used for indicating, such as drxShortCycleTimer (e.g. value 16), and reserve this value for indicating described functionality.

Another embodiment defines a new DRX (shorter) and utilizes different rules for applying this new shorter DRX cycle. This new shorter DRX cycle may also be configured by the eNB and/or network. Further, this new shorter DRX may be applied while the TAT is running independent of whether the UE is being scheduled or not. When the TAT expires, the shorter DRX cycle is no longer applied and the UE uses the configured longer DRX cycle. In one embodiment, the longer DRX is applied until the next occurrence of either 1) PDCCH order or 2) UE uplink resource request (RACH) when receiving a new TA value triggering a start of TAT (TAT is valid).

It should be noted that the embodiments outlined above are just two examples of how the invention can be applied, and the invention is not limited to these examples. Other embodiments can be realized in different ways.

For example, the network can keep TAT running if it believes that further scheduling is imminent, such as by sending a timing advance command MAC control element to the UE. In one embodiment, keeping the TAT valid may also trigger the shorter DRX cycle to be applied in the sense that the UE is scheduled (the MAC command) and this will trigger the shorter DRX cycle to be applied.

The current 3GPP specifications have no synchronization or alignment between the TAT and the application of short DRX. As a result, it is not possible within the current 3GPP specifications' DRX setting options to combine a relatively short DRX for a longer period while the TAT is running (likelihood for scheduling is higher) with a relative long DRX cycle when TAT is not running (likelihood for scheduling is smaller). Therefore, in the current 3GPP specifications, the eNB would need to keep scheduling the UE (unnecessarily) for triggering the short DRX cycle to be applied (if used) or, alternatively, not use the short DRX cycle and only use the long DRX cycle with very short cycles. The latter approach will have negative effects and impact on the UE options for power savings as the longer DRX cycles would not be possible to use without reconfiguration of the DRX configuration.

Therefore, in the current 3GPP specifications, the applicability of short/long DRX cycles and how to ensure the short DRX cycle works rather independently from the TAT, and limits the possibilities for using the available synergies. By combining the state of the TAT (running or expired) with when the UE has to use a shorter DRX cycle (TAT running) or longer DRX cycle (TAT expired), embodiments of the invention provide an intelligent combination of the scheduling likelihood (based on TAT state) and the required PDCCH monitoring (DRX cycle) on the UE side thereby enabling the full use of synergy between the two procedures. Further, this combination can be used for optimization of the UE power saving options in E-UTRAN RRC connected mode, together with optimal fast reaction time and flexible scheduling on the network side.

FIG. 1 illustrates a signaling diagram between UE 100 and eNB 101 where the TAT and the application of short DRX cycles are functioning independently. As illustrated in FIG. 1, at 102, the network is in RRC connected mode. At 103, the UE 100 is in DRX mode and the TAT is expired. The UE 100 is configured with long and short DRX for efficient power savings. The UE 100 transmits a random access preamble transmission 104 to the eNB 101. The eNB 101 then transmits a random access response 105 to the UE 100. The random access response 105 may include a timing advance (TA), in addition to other information. At 106, upon receiving the TA, the UE 100 starts the TAT. At 107, the UE 100 and eNB 101 enter contention resolution mode. The eNB 101 transmits an RRC connection reconfiguration message 108, which may include both long and short DRX configuration, to the UE 100.

At 109, the UE 100 applies a short DRX cycle and a timer/counter keeps track of how long (time/instances) the short DRX shall be applied. After applying the short DRX cycle, at 110, the UE 100 monitors the PDCCH at least every short DRX. Then, at 111, the short DRX timer/counter expires and the UE 100 begins applying the long DRX cycle. As a result, at 112, the UE 100 monitors the PDCCH at least every long DRX cycle. At 113, the TAT expires and PUCCH/SRS is released. At 114, the UE 100 continues to monitor the PDCCH at every long DRX cycle.

Figure 2:
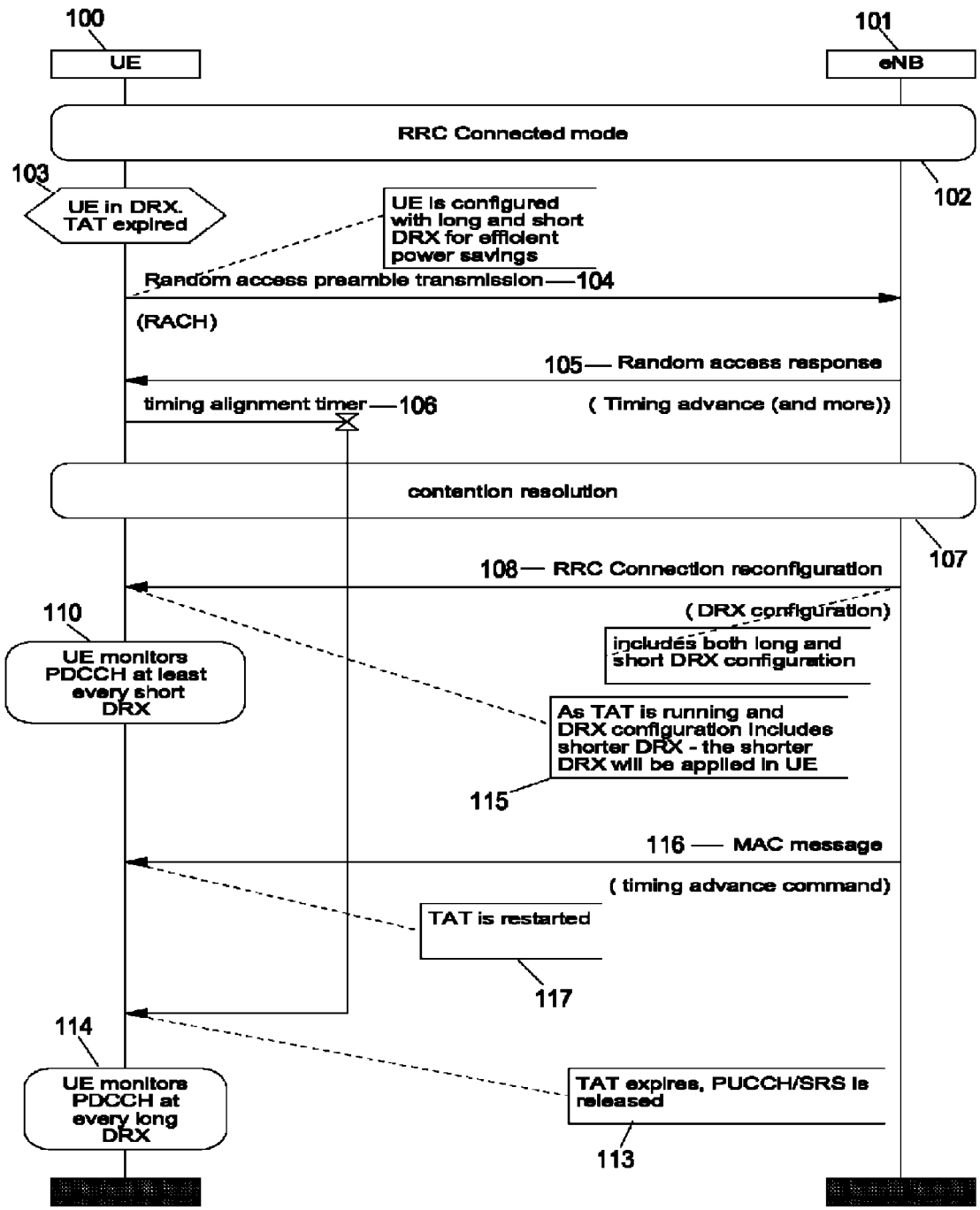
FIG. 2 illustrates a signaling diagram according to one embodiment.

FIG. 2 illustrates another signaling diagram between UE 100 and eNB 101 where a shorter DRX cycle is applied based on the scheduling likelihood and TAT states, according to one embodiment of the invention. Similar to FIG. 1 discussed above, at 102, the network is in RRC connected mode. At 103, the UE 100 is in DRX mode and the TAT is expired. The UE 100 is configured with long and short DRX for efficient power savings. The UE 100 transmits a random access preamble transmission 104 to the eNB 101. The eNB 101 then transmits a random access response 105 to the UE 100. The random access response 105 may include a timing advance (TA), in addition to other information. At 106, the UE 100 receives the TA value to be applied and starts the TAT. At 107, the UE 100 and eNB 101 enter contention resolution mode. The eNB 101 transmits an RRC connection reconfiguration message 108, which may include both long and short DRX configuration, to the UE 100.

At 115, since the TAT is running and the DRX configuration includes shorter DRX cycle, the shorter DRX cycle will be applied in the UE 100. Therefore, at 110, the UE 100 monitors the PDCCH at least every short DRX cycle. The eNB 101 may transmit a MAC message 116, which may include a timing advance command and, at 117, the TAT is restarted. Accordingly, the UE 100 continues to monitor the PDCCH at least every short DRX cycle until the TAT expires at 113 and the PUCCH/SRS is released. Once the TAT is expired, at 114, the UE 100 begins to monitor the PDCCH every long DRX cycle.

Figure 3:
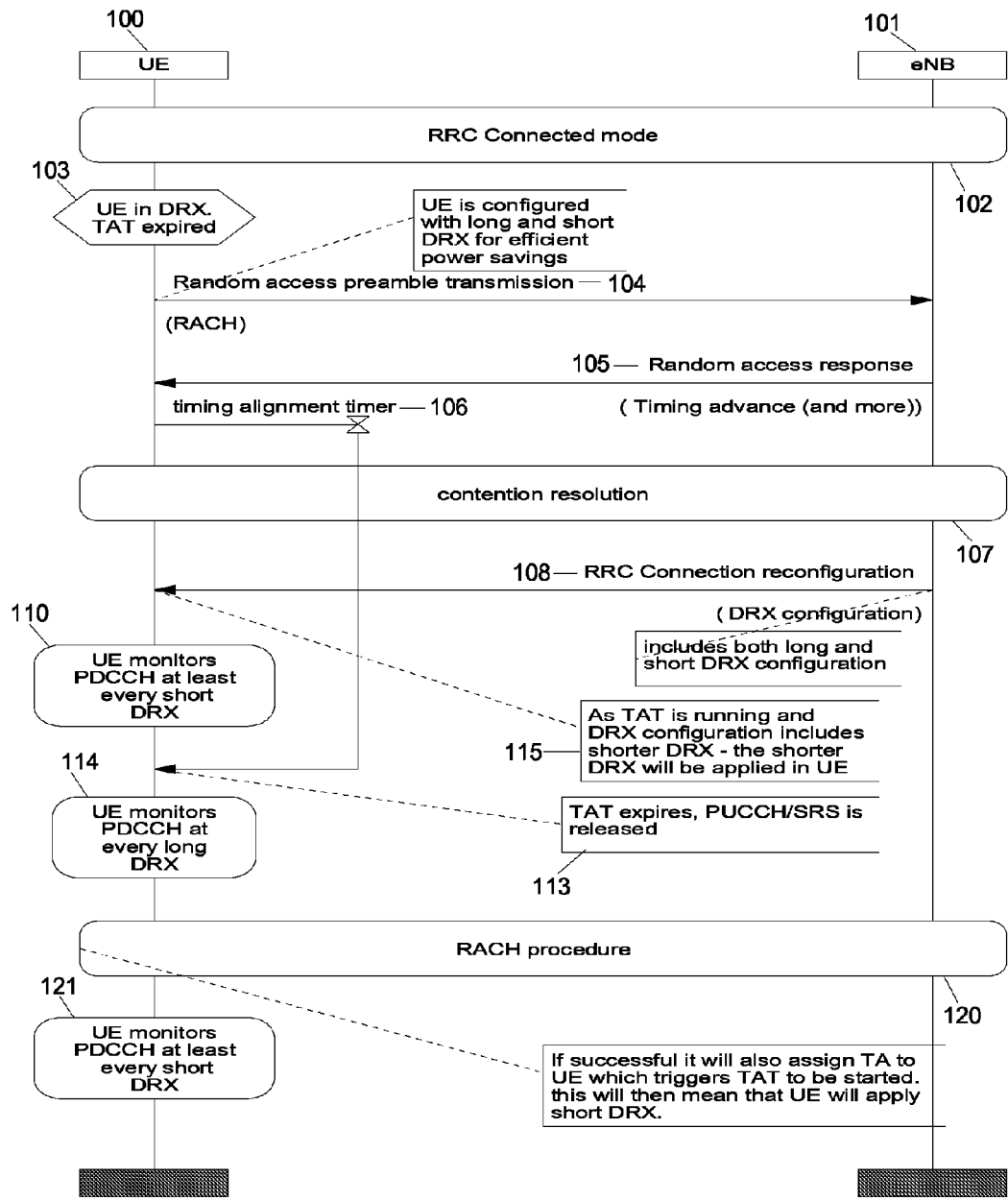
FIG. 3 illustrates a signaling diagram according to another embodiment.

FIG. 3 illustrates another example of a signaling diagram between UE 100 and eNB 101 where a shorter DRX cycle is applied based on the scheduling likelihood and TAT states, and which also illustrates an example after TAT expiry and update, according to an embodiment. Similar to FIG. 2 discussed above, at 102, the UE and network are in RRC connected mode. At 103, the UE 100 is in DRX mode and the TAT is expired. The UE 100 transmits a random access preamble transmission 104 to the eNB 101, and the eNB 101 then transmits a random access response 105 to the UE 100. At 106, the UE 100 receives the TA value to be applied and starts the TAT. At 107, the UE 100 and eNB 101 enter contention resolution mode. The eNB 101 transmits an RRC connection reconfiguration message 108, which may include both long and short DRX configuration, to the UE 100. At 115, since the TAT is running and the DRX configuration includes shorter DRX cycle, the shorter DRX cycle will be applied in the UE 100. Accordingly, at 110, the UE 100 monitors the PDCCH at least every short DRX cycle. At 113, the TAT expires, the PUCCH/SRS is released, and, therefore, at 114, the UE 100 begins to monitor the PDCCH every long DRX cycle.

Then, at 120, a random access procedure is performed, for example on random access channel (RACH). If successful, the RACH procedure will result in the assignment of a TA to the UE 100, which triggers the TAT to be started. Since the TAT is now running, the UE 100 will apply the shorter DRX cycle and monitor the PDCCH at least every short DRX cycle at 121.

Figure 4:
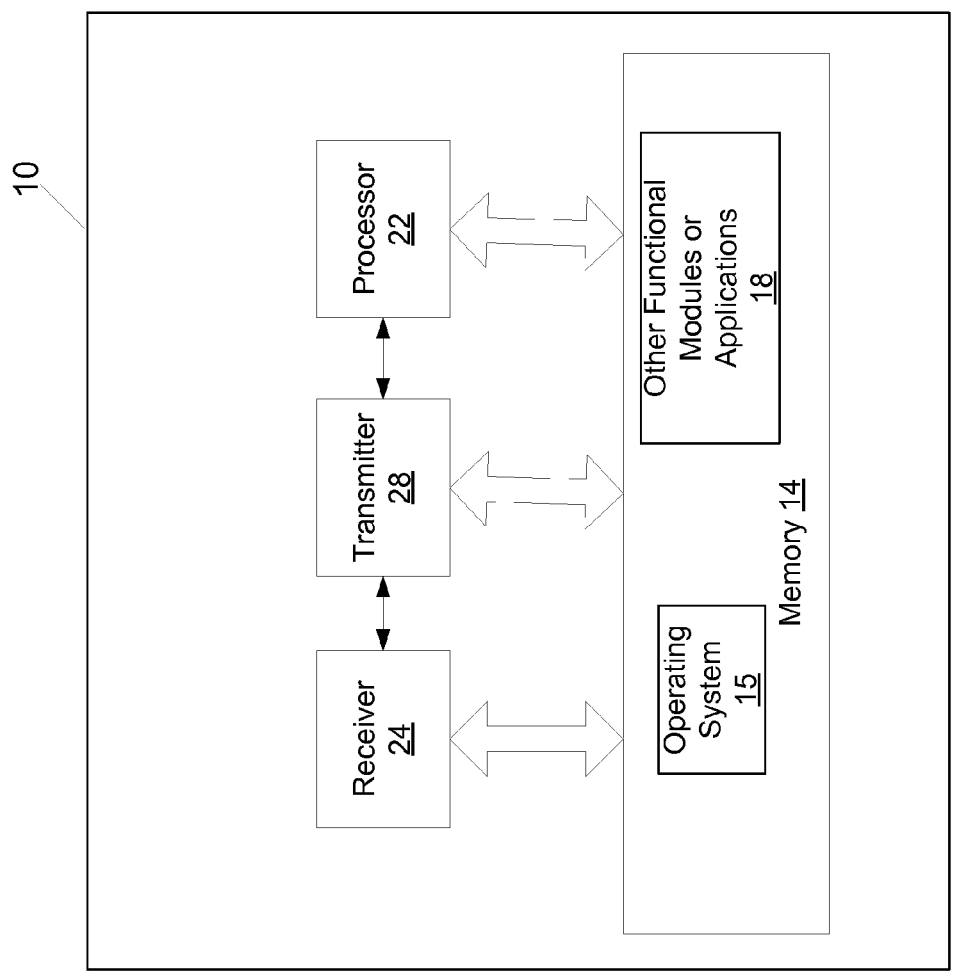
FIG. 4 illustrates an apparatus according to one embodiment.

FIG. 4 illustrates an apparatus 10 configured to execute an enhanced DRX scheme, in accordance with one embodiment. In one embodiment, apparatus 10 may be the UE 100 shown in FIGS. 1-3. Apparatus 10 includes a processor 22 for processing information and executing instructions or operations. Processor 22 may be any type of general or specific purpose processor. While a single processor 22 is shown in FIG. 4, multiple processors may be utilized according to other embodiments.

Apparatus 10 further includes a memory 14, coupled to processor 22, for storing information and instructions to be executed by processor 22. Memory 14 can be comprised of any combination of random access memory ("RAM"), read only memory ("ROM"), static storage such as a magnetic or optical disk, or any other type of non-transitory machine or computer readable media.

Apparatus 10 may further include a transmitter 28 for transmitting information, such as data and/or control signals. Apparatus 10 also includes receiver 24 for receiving information including data and/or control signals. In some examples, the receiver and transmitter functionality may be implemented in a single transceiver unit.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, memory 14 and the computer program code stored thereon may be configured, with processor 22, to cause the apparatus 10 to receive a TA value to be applied, to initialize a TAT, to determine a type of DRX cycle to apply based on the likelihood of scheduling of the apparatus 10, and to apply the determined type of discontinuous reception cycle. In some embodiments, the type of DRX cycle may include a shorter DRX cycle or a longer DRX cycle, as discussed above.

According to some embodiments, memory 14 and the computer program code stored thereon may further be configured, with processor 22, to cause the apparatus to determine the likelihood of scheduling from a state of the TAT. For example, the TAT may be in a running state or an expired state. In one embodiment, when the TAT is expired, the likelihood of scheduling the apparatus 10 is low and the memory 14 and the computer program code stored thereon may be configured, with processor 22, to cause the apparatus to apply the longer DRX cycle. However, when the TAT is running, the likelihood of scheduling the apparatus 10 is high and the memory 14 and the computer program code stored thereon may be configured, with processor 22, to cause the apparatus to apply the shorter DRX cycle.

According to some embodiments, apparatus 10 may be embodied as a UE, mobile station or terminal, such as a mobile telephone, smart phone, personal data assistant (PDA), laptop, netbook, or any other device capable of wireless communication. In other embodiments, apparatus 10 may be embodied as an eNB or other network element.

Figure 5:
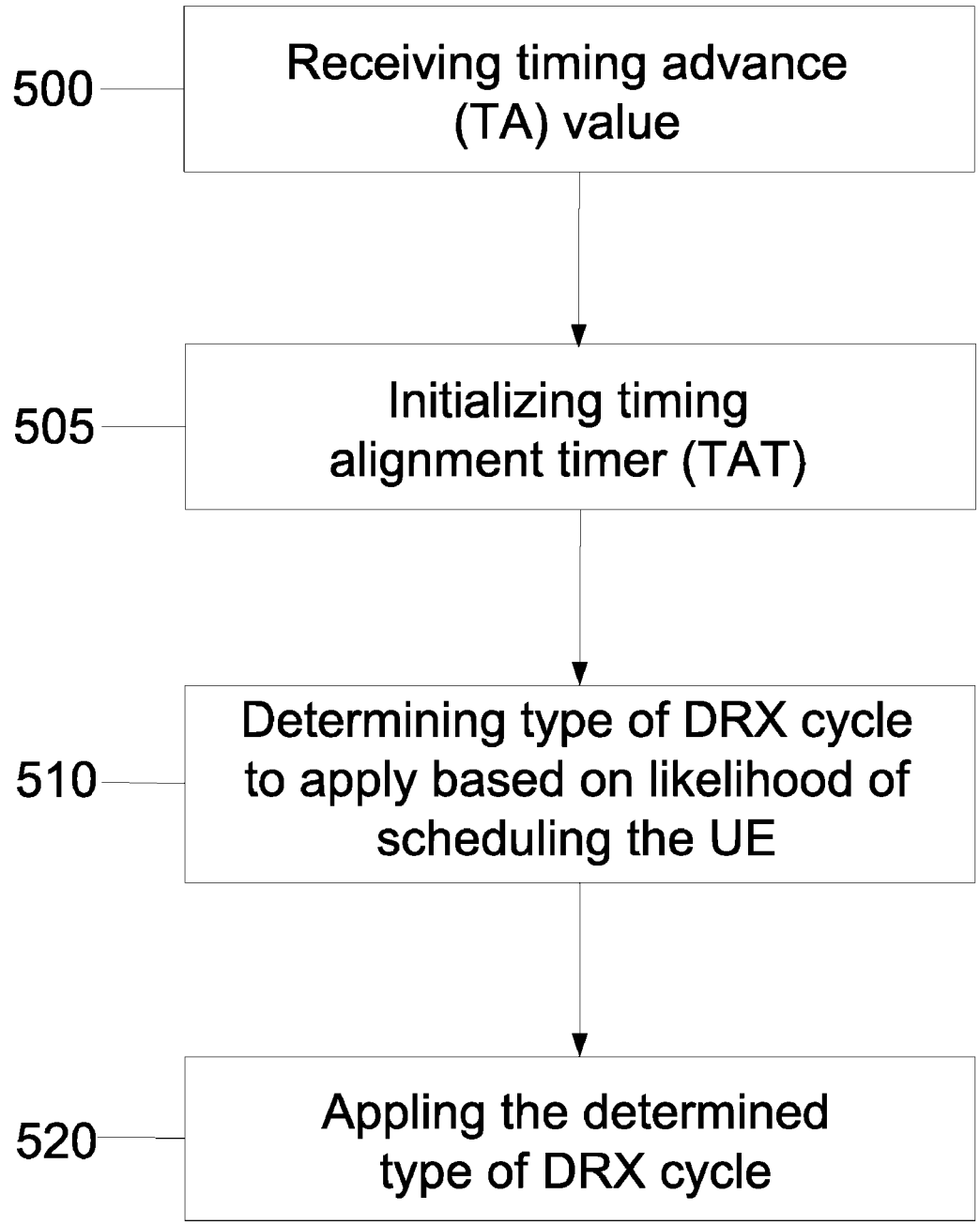
FIG. 5 illustrates a flow diagram of a method according to an embodiment.

FIG. 5 illustrates a flow diagram of a method for applying a flexible DRX scheme based on the likelihood of scheduling the user equipment, according to one embodiment. In some embodiments, the method illustrated in FIG. 5 may be performed by the apparatus 10 discussed above in connection with FIG. 4. The method includes, at 500, receiving a TA value to be applied and, at 505, initializing a TAT. At 510, the method includes determining the type of DRX cycle to apply based on the likelihood of scheduling of the UE. Based on the determination of the type of DRX cycle to apply, the method includes, at 520, applying the determined type of DRX cycle. For example, when the TAT is expired, the likelihood of scheduling the UE is low and the method will result in applying the longer DRX cycle. However, when the TAT is running, the likelihood of scheduling the UE is high and the method will result in applying the shorter DRX cycle.

As a result, embodiments of the invention are able to combine the knowledge of scheduling likelihood with the UE PDCCH monitoring (DRX) requirements to achieve an enhanced DRX scheme. As a result, embodiments of the invention enable longer periods of shorter DRX cycles which reduces delay and latency when scheduling is likely to happen.

In some embodiments, the functionality of the flow diagram of FIG. 5, or that of any other method described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Thus, another embodiment of the invention may include a computer program embodied on a computer readable medium. The computer program is configured to control a processor to perform a process. The process may include receiving a TA value to be applied, initializing a TAT, and determining the type of DRX cycle to apply based on the likelihood of scheduling of the UE. Based on the determination of the type of DRX cycle to apply, the process further includes applying the determined type of DRX cycle.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   initializing, at a user equipment, a timing alignment timer;
   determining a type of discontinuous reception cycle to apply based on a likelihood of scheduling of the user equipment;
   determining the likelihood of scheduling from a state of the timing alignment timer; and
   applying the determined type of discontinuous reception cycle.

2. The method according to claim 1, wherein the determining the type of discontinuous reception cycle to apply comprises determining whether to apply a shorter discontinuous reception cycle or a longer discontinuous reception cycle.

3. The method according claim 1, wherein the state of the timing alignment timer comprises one of running or expired.

4. The method according to claim 2, wherein, when the timing alignment timer is expired, the likelihood of scheduling the user equipment is low and the applying comprises applying the longer discontinuous reception cycle.

5. The method according to claim 2, wherein, when the timing alignment timer is running, the likelihood of scheduling the user equipment is high and the applying comprises applying the shorter discontinuous reception cycle.

6. The method according to claim 1, wherein the state of the timing alignment timer is synchronized between the user equipment and corresponding node-B.

7. An apparatus, comprising:
   at least one processor; and
   at least one memory including computer program code,
   the at least one memory and the computer program code configured, with the at least one processor, to cause the apparatus at least to
   initialize a timing alignment timer;
   determine a type of discontinuous reception cycle to apply based on a likelihood of scheduling of the apparatus;
   determine the likelihood of scheduling from a state of the timing alignment timer; and
   apply the determined type of discontinuous reception cycle.

8. The apparatus according to claim 7, wherein the type of discontinuous reception cycle comprises one of a shorter discontinuous reception cycle or a longer discontinuous reception cycle.

9. The apparatus according to claim 7, wherein the state of the timing alignment timer comprises one of running or expired.

10. The apparatus according to claim 8, wherein, when the timing alignment timer is expired, the likelihood of scheduling the apparatus is low and the at least one memory and the computer program code are further configured, with the at least one processor, to cause the apparatus at least to apply the longer discontinuous reception cycle.

11. The apparatus according to claim 8, wherein, when the timing alignment timer is running, the likelihood of scheduling the apparatus is high and the at least one memory and the computer program code are further configured, with the at least one processor, to cause the apparatus at least to apply the shorter discontinuous reception cycle.

12. The apparatus according to claim 7, wherein the apparatus comprises user equipment.

13. A computer program, embodied on a non-transitory computer readable medium, the computer program configured to control a processor to perform a process, comprising:
   initializing, at a user equipment, a timing alignment timer;
   determining a type of discontinuous reception cycle to apply based on a likelihood of scheduling of the user equipment;
   determining the likelihood of scheduling from a state of the timing alignment timer; and
   applying the determined type of discontinuous reception cycle.

14. The computer program according to claim 13, wherein the determining the type of discontinuous reception cycle to apply comprises determining whether to apply a shorter discontinuous reception cycle or a longer discontinuous reception cycle.

15. The computer program according to claim 13, wherein the state of the timing alignment timer comprises one of running or expired.

16. The computer program according to claim 14, wherein, when the timing alignment timer is expired, the likelihood of scheduling the user equipment is low and the applying comprises applying the longer discontinuous reception cycle.

17. The computer program according to claim 14, wherein, when the timing alignment timer is running, the likelihood of scheduling the user equipment is high and the applying comprises applying the shorter discontinuous reception cycle.

* * * * *